April 27, 1926.  
E. F. HURST  
DEHYDRATOR FOR PETROLEUM EMULSIONS  
Filed Sept. 27, 1924   2 Sheets-Sheet 1  
1,582,404
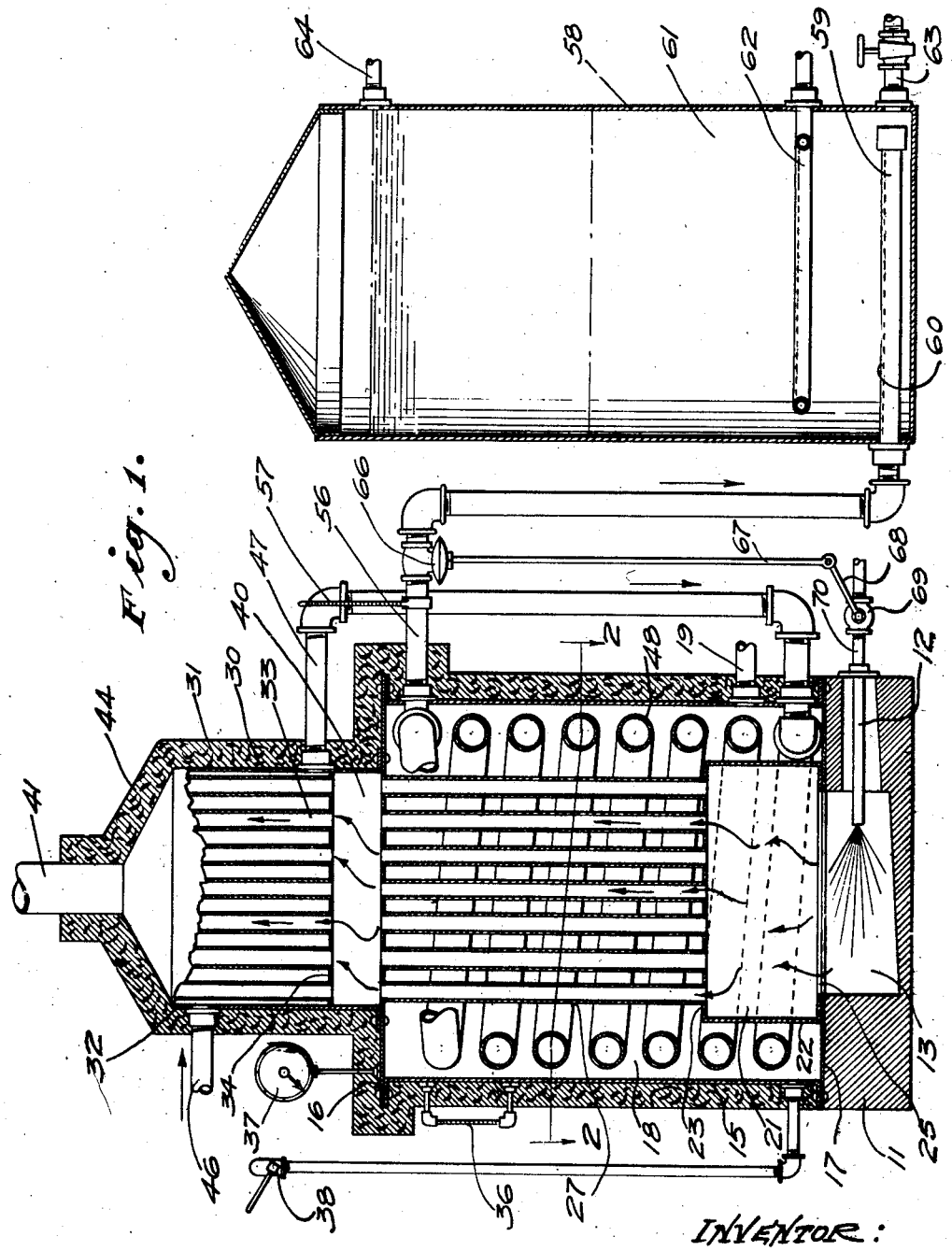
INVENTOR:  
EDWIN F. HURST,  
BY  
ATTORNEY.

April 27, 1926.
E. F. HURST
1,582,404
DEHYDRATOR FOR PETROLEUM EMULSIONS
Filed Sept. 27, 1924    2 Sheets-Sheet 2
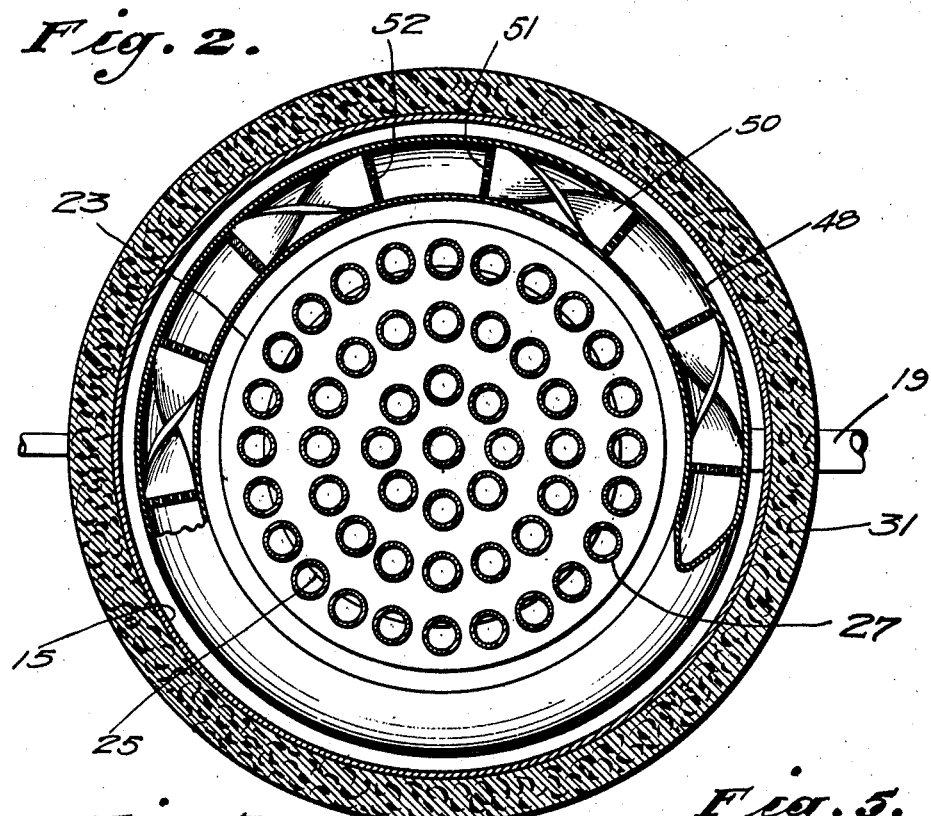
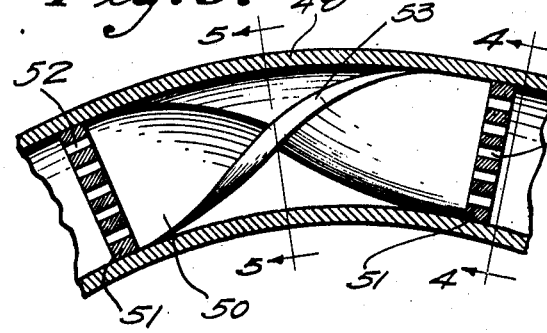
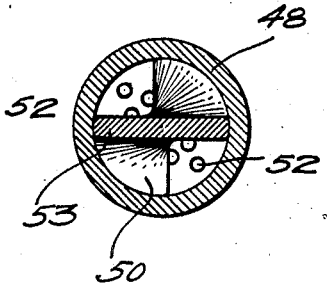
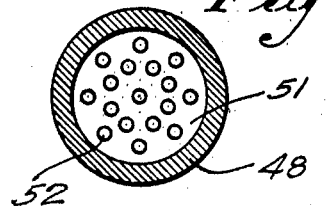
INVENTOR:
EDWIN F. HURST,
BY
ATTORNEY.

Patented Apr. 27, 1926.

1,582,404

UNITED STATES PATENT OFFICE.

EDWIN F. HURST, OF BREA, CALIFORNIA.

DEHYDRATOR FOR PETROLEUM EMULSIONS.

Application filed September 27, 1924. Serial No. 740,229.

*To all whom it may concern:*

Be it known that I, EDWIN F. HURST, a citizen of the United States, residing at Brea, in the county of Orange and State of California, have invented a new and useful Dehydrator for Petroleum Emulsions, of which the following is a specification.

This invention relates to the art of refining oil, and it relates specifically to apparatus known as dehydrators which are employed in this art for the purpose of separating water from petroleum oil.

Oil in its crude stage is sometimes found to be in the form of an emulsion containing particles of water. The emulsion may be formed due to the association of the oil with ground water or association with water during transportation. A certain portion of the particles of water may be separated by gravitation; some of the particles, however, being very minute in size, will not separate by gravitation without subjecting the emulsion to special treatment. Two general types of apparatus are employed for treating emulsions of this character, one being an electrostatic apparatus, and the other being a heating apparatus. This invention relates to the heating type of dehydrator.

It is an object of this invention to provide an apparatus for treating emulsion which will very efficiently heat the emulsion to coalesce the water particles therein, and which will utilize a maximum of heat energy applied thereto.

It is an other object of the invention to provide, in a device of this character, an automatic means for controlling the burner of the device in a manner to regulate the temperature at which the emulsion will flow therefrom.

It is a still further object of this invention to provide, in a dehydrator of this character, a means for causing rapid and thorough coalescing of the minute globules of water contained in the emulsion being treated. This means is in the form of a construction located in a passage through which the emulsion passes.

It is especially designed to affect the emulsion in a manner to bring the globules in forceful contact with one another to cause agglomeration.

Further objects and advantages of the invention will be made evident hereinafter.

Referring to the drawings which are for illustrative purposes only,

Fig. 1 is a vertical sectional view of an apparatus employing the features of my invention.

Fig. 2 is a section taken as indicated by the line 2—2 of Fig. 1.

Fig. 3 is an enlarged fragmentary section which clearly shows the coalescing construction provided by the invention.

Fig. 4 is a section taken as indicated by the line 4—4 of Fig. 3.

Fig. 5 is a section taken as indicated by the line 5—5 of Fig. 3.

As shown in Fig. 1, my invention provides a furnace 11 having a burner 12 which is arranged to provide a flame in the chamber 13 thereof. Resting on the furnace 11 is a treater which is in the form of a cylindrical shell 15 having a tight top 16 and a tight bottom 17, this construction providing a chamber 18 which is arranged to be filled with a liquid such as water through an inlet pipe 19. Within the chamber 18, and at the lower end thereof, is provided a fire box 21 which has a cylindrical wall 22 and a top wall 23. Products of combustion from the burner 12 may enter the fire box 21 through an opening 25 provided in the bottom 17 of the chamber 18. Extending upwardly from the top 23 of the fire box 21 are fire tubes 27, which are secured in the top 23 at the lower end thereof and are secured to the top plate 16 at the upper end thereof. Secured on the top plate 16 of the chamber 18 is an oil preheater 30 which is in the form of a shell 31 which is secured to the top 16, this shell 31 providing an oil preheating chamber 32. Extending through the preheating chamber 32 are tubes 33, the lower ends of which are secured in a plate 34, as shown in Fig. 1.

The heat provided by the burner 12 passes into the fire box 21 and through the fire tubes 27, heating the water or liquid in the chamber 18, this water being preferably heated to a temperature of between 220 and 250 degrees Fahrenheit. The level of the water in the chamber 18 may be ascertained by means of a gauge 36. The pressure may be ascertained by means of a pressure gauge 37. To prevent an excess of pressure beyond a certain degree in the chamber 18, I provide a safety valve 38 which may be set as desired. The hot gases, after passing through the fire tubes, pass into a chamber 40 in the lower portion of the preheater 30, and from thence pass to the tubes 33 heating the contents of the preheating chamber 32 and then passing through an outlet flue 41. The complete apparatus described is provided with an insulation covering 44, as shown.

Oil is introduced into the preheating chamber 33 through a piping 46. The oil while in the chamber 32 is preheated to a substantial degree. A piping 47 is provided which carries the oil from the preheater 32 and delivers it, as shown, into a treating coil 48 situated in the treating chamber 18, the oil being introduced at the lower end of the coil, as shown.

A very important feature of my invention resides in the coalescing members 50 which are situated within the treating coil 48, as clearly shown in Figs. 2 to 5, inclusively. The coalescers 50 are provided in the form of pairs of heads 51 which are secured in the coil 48 and which have perforations 52 provided therein. As shown in Fig. 4, it will be seen that the heads 51 completely close the passage of the coil 48 and the oil in passing therethrough must flow through the perforations 52 in the heads 51. Arranged between the pairs of heads 51 are vanes or baffle members 53, the baffle members 53 being twisted as shown in the drawings, and the edges thereof fitting very tightly against the inner wall of the treating coil 48. The purpose of the baffles 53 is to direct the emulsion through a sinuous path.

The emulsion, as it passes through the coalescers, is subjected to an action which is efficacious in agglomerating the globules of water contained therein. The emulsion when it enters the treating coil 48 is immediately raised in temperature due to the contact of the coil 48 with the liquid in the chamber 18. The heated emulsion is forced through the orifices 52 in the heads 51, this causing the globules of water to forcibly contact with each other and to join. In passing between the pairs of heads 51, the globules are also compacted together which continues to coalesce due to the swirling thereof by the vanes 53. Further by directing the emulsion through a sinuous path, all portions thereof are brought into the adjacency of the wall of the treating coil 48, and the emulsion will be very evenly and thoroughly heated which will contribute to an efficient coalescing of the water particles.

The emulsion, as it passes from the coil 48 through piping 56, should be at a temperature of between 150 and 180 degrees Fahrenheit, this temperature being readily discerned by a thermometer 57 disposed in the piping 56. The piping 56 conducts the emulsion into the lower end of a settling tank 58, the piping 56 connecting to a perforated pipe 59. The emulsion flows through perforations 60 in the pipe 59 rising upwardly through a body of hot water 61 which is efficacious in washing residue from the oil. Steam or hot water is supplied to the settling tank 58 through a pipe 62. Water and sludge may be removed from the settling tank through a piping 63 and cleansed oil may be conducted through a pipe 64 situated near the upper portion of the tank 58.

In order to regulate the temperature of the oil which flows from the coil 48 through the pipe 56, I provide a means which comprises a regulating valve 66 disposed in the pipe line 56. The regulating valve 66 has a rod 67 which connects to an arm 68 of a control valve 69 disposed in a pipe 70 which feeds the burner 12. The diaphragm of the valve 66 is affected by the temperature of the oil, this being effective in closing or opening the valve 69 through the rod 67 and the arm 68. This construction will very effectively maintain the oil at any desired constant temperature.

From the foregoing description and drawings, it will be seen that the apparatus shown very effectively heats the oil with a minimum of heat loss. This is due to the usage of the particular style of fire box and tube construction, and due to the arranging of the preheater above the treating chamber so that any heat left in the products of combustion, passing therethrough, will be consumed by the oil in the chamber 32. The water in the emulsion is very thoroughly coalesced by the novel form of coalescing members which the invention provides, and may readily gravitate therefrom in the settling tank.

I claim as my invention:

1. In an apparatus of the class described, the combination of: walls forming a treating chamber; walls forming a preheating chamber, said preheating chamber being situated above said treating chamber; a fire box situated in the lower portion of said treating chamber; fire tubes within said treating chamber, said fire tubes extending from the top of said fire box to the top of said treating chamber; tubes extending through said preheating chamber, said tubes being in communication with said fire tubes; a burner for producing heat, the products of combustion from said burner passing through said fire box, said fire tubes and said tubes, heating said treating chamber and said preheating chamber; a liquid in said chamber, said liquid being heated by said products of combustion; piping for introducing emulsion into said preheating chamber where it is preheated; a treating coil located in said treating chamber; piping for conducting said emulsion from said preheating chamber to said treating coil; means situated in said treating coil for coalescing the water particles in said emulsions; and a settling tank in which the oil and water of said emulsion separate.

2. In an apparatus of the class described, the combination of: walls forming a treating chamber; walls forming a preheating chamber, said preheating chamber being situated above said treating chamber; a fire box situated in the lower portion of said treating chamber; fire tubes within said treating chamber, said fire tubes extending from the top of said fire box to the top of said treating chamber; tubes extending through said preheating chamber, said tubes being in communication with said fire tubes; a burner for producing heat, the products of combustion of said burner passing through said fire box, said fire tubes and said tubes, heating said treating chamber and said preheating chamber; a liquid in said treating chamber, said liquid being heated by said products of combustion; piping for introducing emulsion into said preheating chamber where it is preheated; a treating coil located in said treating chamber; and piping for conducting said emulsion from said preheating chamber to said treating coil.

3. In an apparatus of the class described, the combination of: walls forming a treating chamber; walls forming a preheating chamber, said preheating chamber being situated above said treating chamber; a fire box situated in the lower portion of said treating chamber; fire tubes within said treating chamber, said fire tubes extending from the top of said fire box to the top of said treating chamber; tubes extending through said preheating chamber, said tubes being in communication with said fire tubes; a burner for producing heat, the products of combustion of said burner passing through said fire box, said fire tubes and said tubes, heating said treating chamber and said preheating chamber; a liquid in said treating chamber, said liquid being heated by said products of combustion; piping for introducing emulsion into said preheating chamber where it is preheated; a treating coil located in said treating chamber; piping for conducting said emulsion from said preheating chamber to said treating coil; piping for conducting said emulsion from said treating coil; and means operating between said piping for conducting oil from said treating coil and said burner, said means being operated by the temperature of said emulsion passing from said treating coil for regulating the flame of said burner.

In testimony whereof, I have hereunto set my hand at Los Angeles, California, this 22nd day of September 1924.

EDWIN F. HURST.